May 11, 1926.

G. W. ANDREWS

VIEW SCOPE

Filed August 1, 1924

1,584,500

Patented May 11, 1926.

1,584,500

UNITED STATES PATENT OFFICE.

GEORGE W. ANDREWS, OF PEORIA, ILLINOIS.

VIEW SCOPE.

Application filed August 1, 1924. Serial No. 729,447.

My invention relates to view scopes and more particularly to a view scope wherein an electric lighting element is used to illuminate the picture being viewed through the device.

The object of my invention is in the provision of a device adapted to magnify the size of a picture or the like viewed therethru, as well as to illuminate the picture by the enclosure of an electric lighting element therein.

Another object of my invention is in the provision of a device of simple and effective construction.

Other objects of my invention will appear in the following specification taken in connection with the annexed drawings in which—

Figure 1:
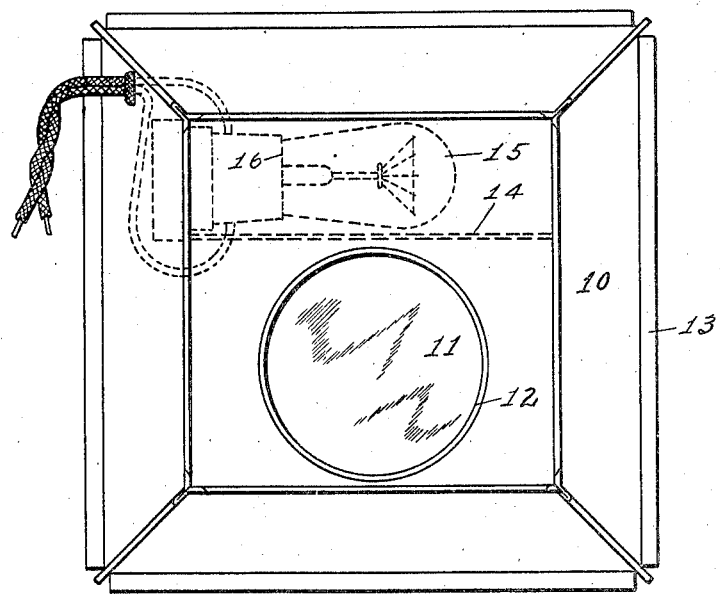
Fig. 1, is a top plan view of the view scope.
Figure 2:
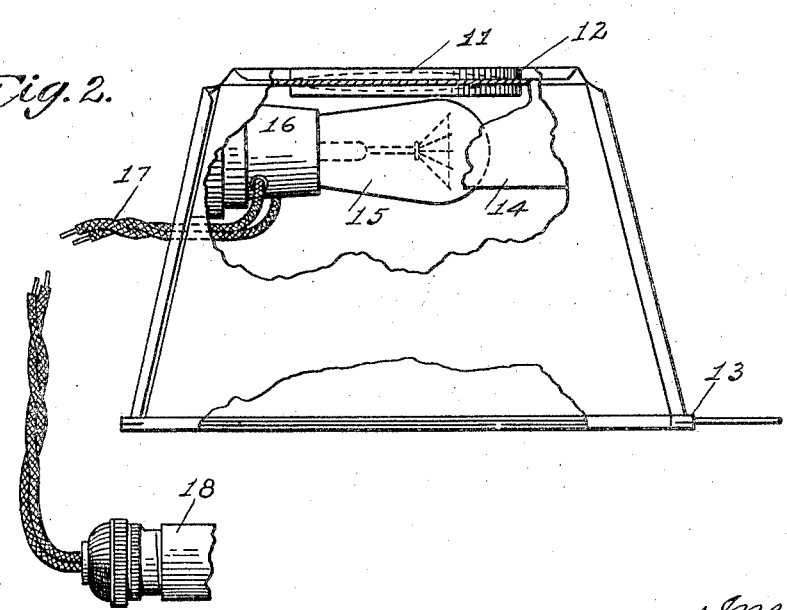
Fig. 2, is a side elevation with portions broken away for a more detailed showing of the various elements.

Referring to the drawings, I am disclosing a simple and efficient device for magnifying pictures, photographs or the like as well as to bring them more clearly before the operator by the use of an electric lighting element.

In accomplishing the above, I have fashioned a view scope or box 10, of metal or any practical material, the said box being fashioned in the manner shown in the drawings, wherein the picture holding end is considerably larger than the upper or observing end. This fashioning of the box portion of the view scope permits the natural focus of the eye as well as the natural range of the magnifying glass 11, that is located in the upper end of the box. The magnifying glass 11, is suitably mounted in a bezel 12 secured to the cover plate of the view scope. Means for holding the pictures that are to be viewed is provided by the flanging of the base 13, to permit a slidable mounting of the picture as well as easy withdrawal, thereof.

A partition 14 is positioned in the box below the cover thereof between the glass holding bezel 12 and a side wall. An electric light socket 16 and bulb 15 are mounted on a side wall of the box and extends into the space formed by said partition and side wall. Flexible conductors 17 are provided for connecting the socket 16 to an attachment plug 18 which may be plugged in any convenient lighting circuit to illuminate the bulb 15.

In using the view scope, the bulb 15 is illuminated by the means just described, a picture or photograph is positioned in the base facing the cover of the box and the observer views the illuminated picture through the magnifying glass in the cover.

What I claim is:

1. A device of the character described having in combination a box having the shape of a frustum of a pyramid, the base of the box being open, a cover for said box provided with an opening therein, a magnifying glass mounted in said opening, flanges upon the bottom edges of the sides of the box adapted to form a slideway for pictures to be viewed through the magnifying glass, a partition depending from the inner surface of the top, the said partition being arranged between the magnifying glass and one of the sides, and an electric bulb mounted between the partition and the said box side for illuminating the picture to be viewed.

2. In a device of the character described, the combination of a box comprising a grooved base member having an opening therein, an apertured cover member and sloping side member, a magnifying glass mounted in the opening in said cover member, a partition depending from the cover member between the glass and a side wall, and an electric bulb secured to an adjacent side wall, and extending into the space formed by said partition and the first-named side wall, said grooved base member adapted to slidably support a picture to be viewed through said magnifying glass.

In testimony whereof I affix my signature.

GEORGE W. ANDREWS.